(12) United States Patent
Bourdon

(10) Patent No.: US 8,333,343 B2
(45) Date of Patent: Dec. 18, 2012

(54) JET ENGINE NACELLE INTENDED TO EQUIP AN AIRCRAFT

(75) Inventor: Gilles Bourdon, Le Havre (FR)

(73) Assignee: Aircelle, Lonfreville L'Orcher ( * ) Notice: Subject to any disclaimer, the term of this patent is extended or adjusted under 35 U.S.C. 154(b) by 341 days.

(21) Appl. No.: 12/674,192

(22) PCT Filed: Jun. 12, 2008

(86) PCT No.: PCT/FR2008/000812
§ 371 (c)(1),
(2), (4) Date: Feb. 19, 2010

(87) PCT Pub. No.: WO2009/027590
PCT Pub. Date: Mar. 5, 2009

(65) Prior Publication Data
US 2011/0272533 A1   Nov. 10, 2011

(30) Foreign Application Priority Data

Aug. 20, 2007   (FR) ...................................... 07 05922

(51) Int. Cl.
*B64D 33/02*   (2006.01)
*B64D 29/00*   (2006.01)
*B64B 1/24*   (2006.01)

(52) U.S. Cl. ........................ 244/53 B; 244/54; 244/53 R

(58) Field of Classification Search ................. 244/53 B, 244/54, 53 R, 129.4; 60/226.2, 796, 798; 16/82, 83, 84, 85, 86 R, 86 A, 86 B, 86 C, 16/362, 374; 292/1, DIG. 17
See application file for complete search history.

(56) References Cited

U.S. PATENT DOCUMENTS

| | | | | |
|---|---|---|---|---|
| 5,046,689 A | * | 9/1991 | Shine | 244/129.4 |
| 5,372,338 A | * | 12/1994 | Carlin et al. | 244/54 |
| 6,032,901 A | * | 3/2000 | Carimali et al. | 244/129.4 |
| 6,334,588 B1 | * | 1/2002 | Porte | 244/129.4 |

(Continued)

FOREIGN PATENT DOCUMENTS

EP   1245769   10/2002

(Continued)

OTHER PUBLICATIONS

International Search Report; PCT/FR2008/000812; Jan. 28, 2009.

*Primary Examiner* — Tien Dinh
*Assistant Examiner* — Marc Burgess
(74) *Attorney, Agent, or Firm* — Brinks Hofer Gilson & Lione

(57) ABSTRACT

The invention relates to a jet engine nacelle intended to equip an aircraft, comprising a forward air inlet section, a mid-section intended to surround a fan of the jet engine, and an aft section formed from at least first and second half-shells (9, 10) rotatably mounted about an axis (A) such that they can each be deployed between a working position in which the half-shells (9, 10) are drawn towards one another and a maintenance position in which the half-shells (9, 10) are spaced apart, the mid- and aft sections being connected to one another by a frame (12) which is fixed with respect to the jet engine, the first and second half-shells (9, 10) being equipped with positioning means (13) which in the working position cooperate with complementary positioning means (14) formed on the fixed frame (12). At least the first half-shell (10) is equipped with the locking means (20) which in the maintenance position cooperate with complementary locking means (16, 17) arranged on the fixed frame (12), so as to prevent the first half-shell (10) from moving translationally along its axis (A).

9 Claims, 4 Drawing Sheets

U.S. PATENT DOCUMENTS

2008/0315034 A1 * 12/2008 Vauchel et al. ................ 244/54

FOREIGN PATENT DOCUMENTS

| | | |
|---|---|---|
| EP | 1515006 | 3/2005 |
| FR | 2771330 | 5/1999 |
| GB | 2266080 | 10/1993 |
| GB | 2384827 | 8/2003 |

* cited by examiner

JET ENGINE NACELLE INTENDED TO EQUIP AN AIRCRAFT

TECHNICAL FIELD

The disclosure relates to a turbojet nacelle designed to be fitted to an aircraft.

BACKGROUND

An aircraft is moved by several turbojets each housed in a nacelle also containing a set of ancillary actuation devices associated with its operation and performing various functions when the turbojet is operating or stopped. These ancillary actuation devices comprise in particular a mechanical system for actuating thrust reversers.

A nacelle usually has a tubular structure comprising an air intake at the front of the turbojet, a mid-section designed to surround a fan of the turbojet, an aft section that can contain thrust-reversing means and designed to surround the combustion chamber of the turbojet, and is usually terminated by an exhaust nozzle the outlet of which is situated downstream of the turbojet.

Modern nacelles are often designed to contain a bypass turbojet capable of generating via the airfoils of the rotating fan a flow of hot air (also called the main flow) originating from the combustion chamber of the turbojet.

A nacelle usually has an external structure which defines, with a concentric internal structure, an annular flow channel (also called an annular ducting channel), also called a stream, designed to channel a flow of cold air, called bypass air, which travels on the outside of the turbojet. The main and bypass flows are exhausted from the turbojet via the rear of the nacelle.

Each propulsion assembly of the aircraft is therefore formed by a nacelle and a turbojet, and is suspended from a fixed structure of the aircraft, for example beneath a wing or on the fuselage, via a pylon or mast attached to the turbojet or to the nacelle.

The aft section of the nacelle is usually formed by a first half-shell and a second half-shell of substantially semicylindrical shape, on either side of a longitudinal vertical plane of symmetry of the nacelle, and mounted movably so as to be able to be deployed between a working position and a maintenance position for the purpose of providing access to the turbojet. The two half-shells are usually mounted pivotingly about a longitudinal shaft forming a hinge in the top portion (at 12 o'clock) of the nacelle. The half-shells are held in the closed position by means of locking devices placed along a junction line situated in the bottom portion (at 6 o'clock).

The mid-section and aft section are, in conventional manner, connected to one another via a frame that is fixed relative to the turbojet, the first and second half-shells usually being fitted with positioning means interacting in the working position with matching positioning means arranged on the frame.

A nacelle of this type has the drawbacks explained below.

During maintenance operations, the two half-shells are separated from one another so that the positioning means of the half-shells no longer interact with the matching positioning means of the fixed frame.

In this case, the half-shells can be moved in translation along their axis so that, when the nacelle is closed, that is to say when the half-shells are brought together, the positioning means of the half-shells are no longer placed facing the matching positioning means of the frame.

This can cause damage to the positioning means which are furthermore parts called sensitive parts, subjected to great stresses in operation, that is to say during the flight of the aircraft fitted with the nacelle. If these positioning means are damaged too much, the half-shells may be caused to move during flight under the effect of the stresses that they sustain and, in this case, lead at the least to detrimental damage of the equipment.

BRIEF SUMMARY is the disclosure seeks to wholly or partly remedy these drawbacks by proposing a nacelle the maintenance of which does not cause premature damage to the sensitive parts.

Accordingly, the disclosure relates to a turbojet nacelle designed to be fitted to an aircraft, comprising a forward air-intake section, a mid-section designed to surround a fan of the turbojet, and an aft section formed from at least a first half-shell and a second half-shell mounted so as to be able to rotate on an axis so that each of them can deploy between a working position in which the half-shells are brought closer to one another and a maintenance position in which the half-shells are separated from one another, the mid-section and aft section being connected to one another by a frame that is fixed relative to the turbojet, the first and second half-shells being fitted with positioning means interacting in the working position with matching positioning means arranged on the fixed frame, characterized in that the first half-shell at least is fitted with immobilization means interacting, in the maintenance position, with matching immobilization means placed on the frame, in order to prevent the translation of the first half-shell on its axis.

In this manner, the first half-shell is held in position along its shaft during maintenance of the nacelle or of the jet engine. When the half-shells are brought together again, the positioning means can interact with the matching positioning means without damaging the latter.

Preferably, the second half-shell is fitted with immobilization means similar to those of the first half-shell. As a variant, the second half-shell could also be attached in translation to the first half-shell.

Therefore, the friction and wear that appear during maintenance operations relate only to the immobilization means and the matching immobilization means which are nonsensitive portions of the nacelle and can also be easily replaced because of their placement within the nacelle.

Advantageously, the immobilization means comprise a finger placed on the first half-shell, the matching immobilization means comprising a groove placed on the frame, or vice versa.

According to an exemplary embodiment, in the working position of the first half-shell, the immobilization finger is retracted from the groove, and in the maintenance position of the first half-shell, the immobilization finger is inserted into the groove.

In this manner, the immobilization means are active, that is to say fulfill their function of preventing translation, only in the maintenance position. They therefore have no influence on the behavior of the nacelle in flight.

In an exemplary embodiment, the immobilization finger is placed close to the axis of articulation of the corresponding half-shell.

In an exemplary embodiment, the groove is delimited by a U-shaped section piece fixed to the fixed frame.

In this manner, if the section piece is worn, the latter is easily replaceable and requires no particular work or machining on the fixed frame.

Advantageously, the groove comprises sidewalls that are inclined relative to one another so as to form a narrowing of the groove in the direction of engagement of the immobilization finger inside the latter when the half-shells are brought closer to one another.

The sidewalls therefore guide the finger when the nacelle is closed, that is to say when the half-shells are brought together. This guidance makes it possible to dispense with adjusted tolerances of positioning of the finger relative to the groove at the end of the maintenance operations, when the nacelle has to be reclosed.

In an exemplary embodiment, the width of the immobilization finger is substantially equal to the width of the groove in its narrowed zone.

In an exemplary embodiment, the immobilization finger and the corresponding groove are arranged so as to allow, when the half-shells are brought closer to one another, the positioning means to come into contact with the matching positioning means only when the finger reaches the narrowed zone of the groove.

When the finger reaches the narrowed zone of the groove, the range of movement of this finger in the groove along the axis of the half-shell is virtually zero so that a precise positioning of the half-shell relative to the fixed frame is obtained. In this manner, there is certainty that the positioning means correctly interact with the matching positioning means without friction or wear.

The disclosure also relates to an aircraft, characterized in that it is fitted with at least one nacelle according to the an exemplary embodiment.

BRIEF DESCRIPTION OF THE DRAWINGS

In any case, the disclosure will be well understood with the aid of the following description with reference to the appended schematic drawing representing, as an example, an embodiment of this nacelle.

DETAILED DESCRIPTION

Figure 1:
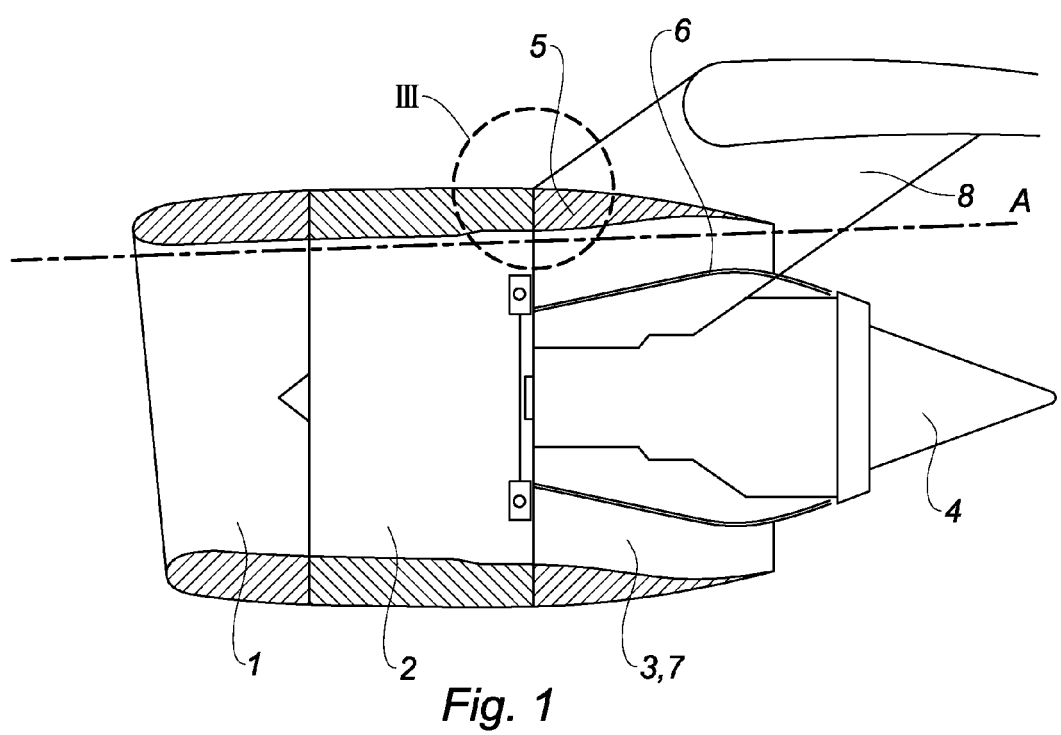
FIG. 1 is a schematic view of a nacelle in longitudinal section.

FIG. 1 represents a nacelle according to an exemplary embodiment designed to be fitted to an aircraft. The latter has a tubular structure comprising a forward air intake 1 of the turbojet, a mid-section 2 designed to surround a fan of the turbojet, an aft section 3 capable of containing thrust-reversal means and designed to surround the combustion chamber of the turbojet, and is terminated by an exhaust nozzle 4 the outlet of which is situated downstream of the turbojet.

The nacelle is designed to contain a bypass turbojet capable of generating, via airfoils of the rotating fan, a flow of hot air (also called the main flow) originating from the combustion chamber of the turbojet.

The nacelle has an external structure 5 which defines, with a concentric internal structure 6, an annular ducting channel 7, also called a stream, designed to channel a flow of cold air, called bypass air, which travels on the outside of the turbojet. The main and bypass flows are exhausted from the turbojet via the rear of the nacelle.

Each propulsion assembly of the aircraft is therefore formed by a nacelle and a turbojet, and is suspended from a fixed structure of the aircraft, for example beneath a wing or on the fuselage, via a pylon or mast 8 attached to the turbojet or to the nacelle.

Figure 2:
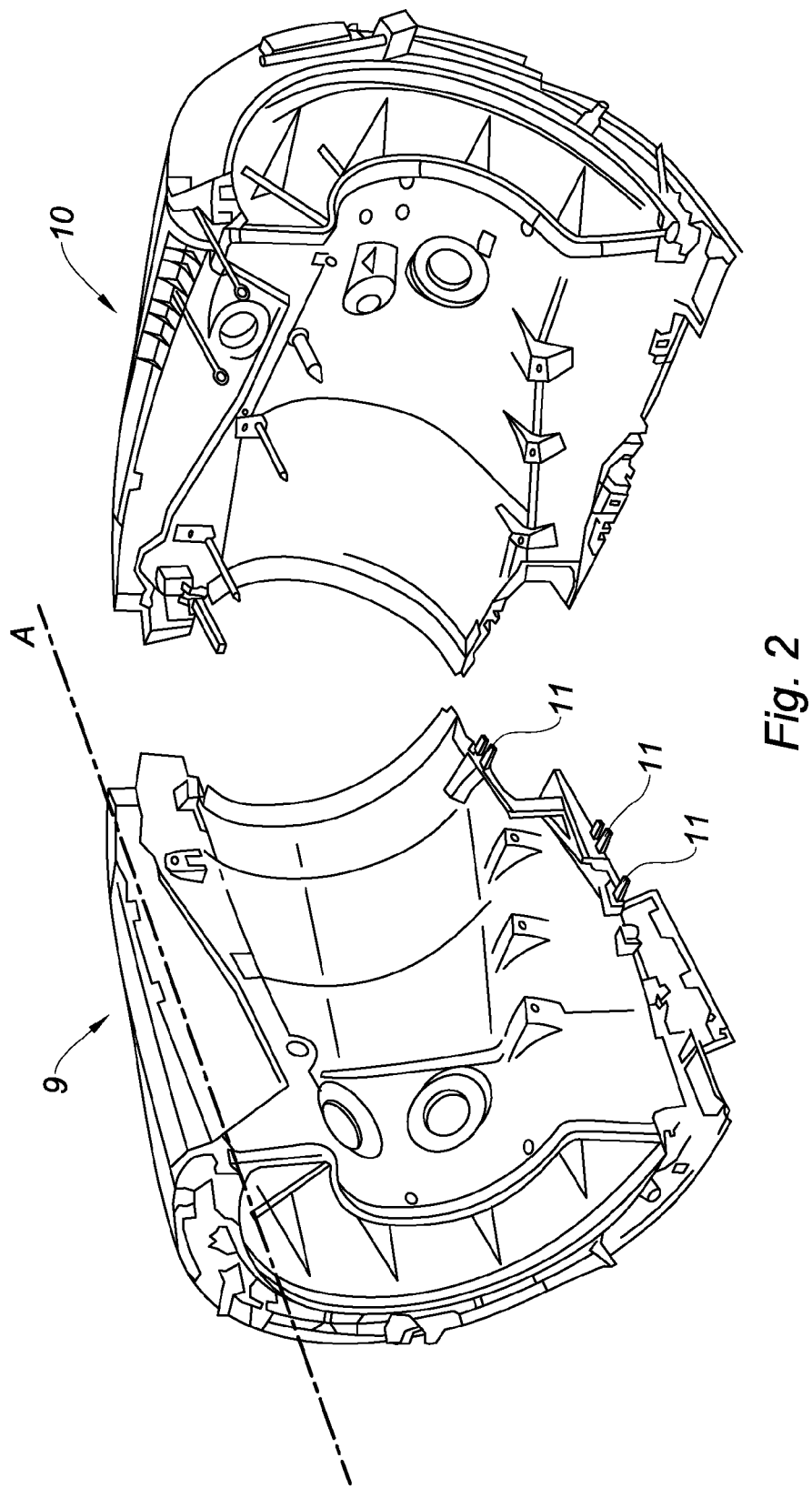
FIG. 2 is an exploded view of the aft section of the nacelle in perspective.

As appears in FIG. 2, the aft section 5 of the nacelle is formed by a first half-shell 9 and a second half-shell 10 of substantially semicylindrical shape, on either side of a vertical longitudinal plane of symmetry of the nacelle, and mounted movably so as to be able to be deployed between a working position and a maintenance position for the purpose of providing access to the turbojet. The two half-shells 9, 10 are mounted pivotingly about an axis A, that can be seen more particularly in FIG. 3, forming a hinge in the top portion (at 12 o'clock) of the nacelle. The half-shells 9, 10 are held in the closed position by means of locking devices 11 placed along a junction line situated in the bottom portion (at 6 o'clock).

The mid-section and aft section 2, 3 are, in conventional manner, connected to one another via a frame 12 that is fixed relative to the turbojet, the first and second half-shells being fitted with positioning means interacting in the working position with matching positioning means arranged on the fixed frame 12.

Figure 4:
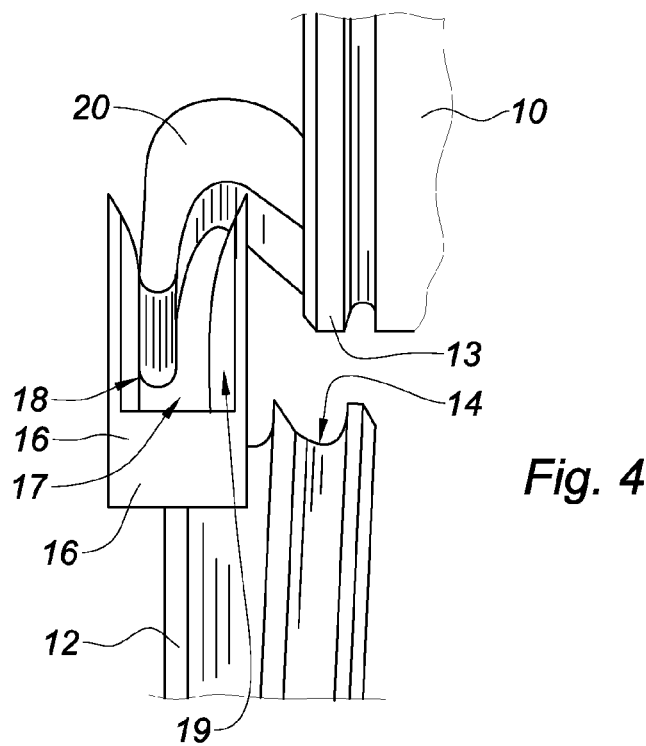
FIGS. 4 to 6 are enlarged views of the aforementioned means respectively in the maintenance position, in an intermediate position and in the working position of the nacelle.
Figure 5:
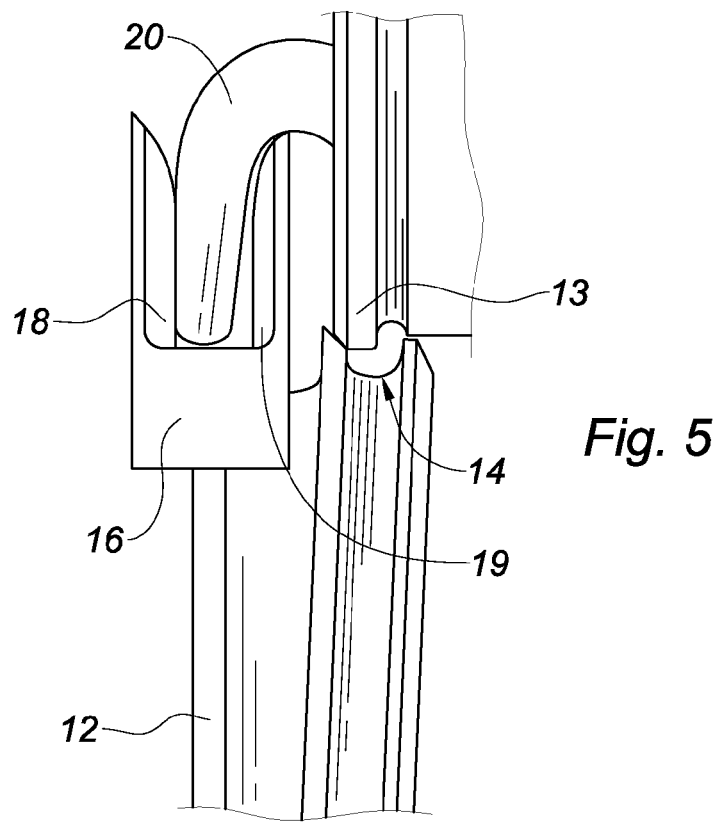
Figure 6:
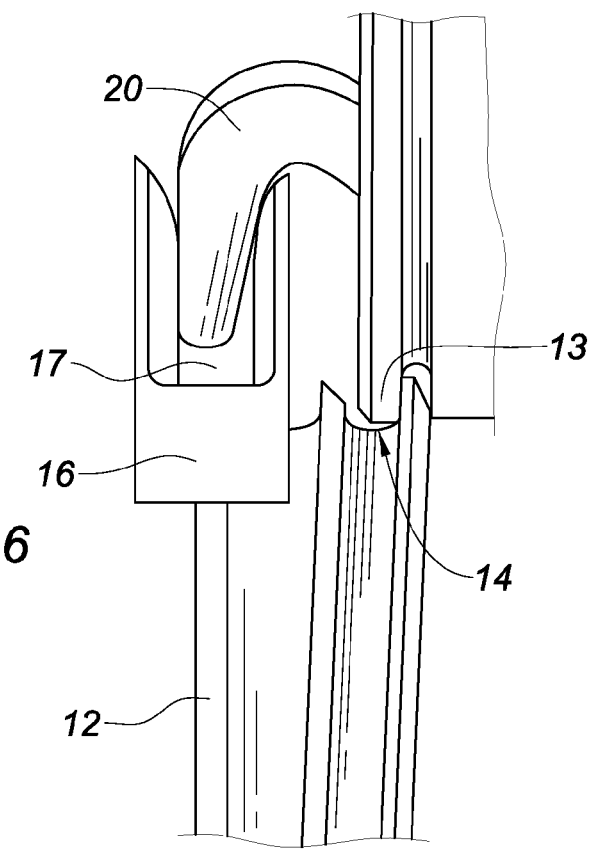

As emerges more particularly from FIGS. 4 to 6, the positioning means comprise a beveled annular rib 13, with a generally V-shaped profile, the matching positioning means having a groove 14 with a matching shape and profile.

The nacelle also comprises immobilization means placed on each half-shell 9, 10 and interacting with matching immobilization means placed on the fixed frame 12.

The immobilization means are placed in the top portion (at 12 o'clock) of each half-shell 9, 10. The latter comprise a finger 20 made in a single piece with an intermediate body 15 fixed to the corresponding half-shell 9, 10. The matching positioning means comprise a U-shaped section piece 16 fixed to the fixed frame 12 facing the finger 20.

The U-shaped section piece 16 delimits a groove 17 into which the finger 20 is inserted when the corresponding half-shell 9, 10 pivots, the groove 17 comprising a first side wall 18 and a second side wall 19 both inclined relative to one another so as to form a narrowing of the groove 17.

The width of the immobilization finger 20 is substantially equal to the width of the narrowed zone of the groove 17.

Figure 3:
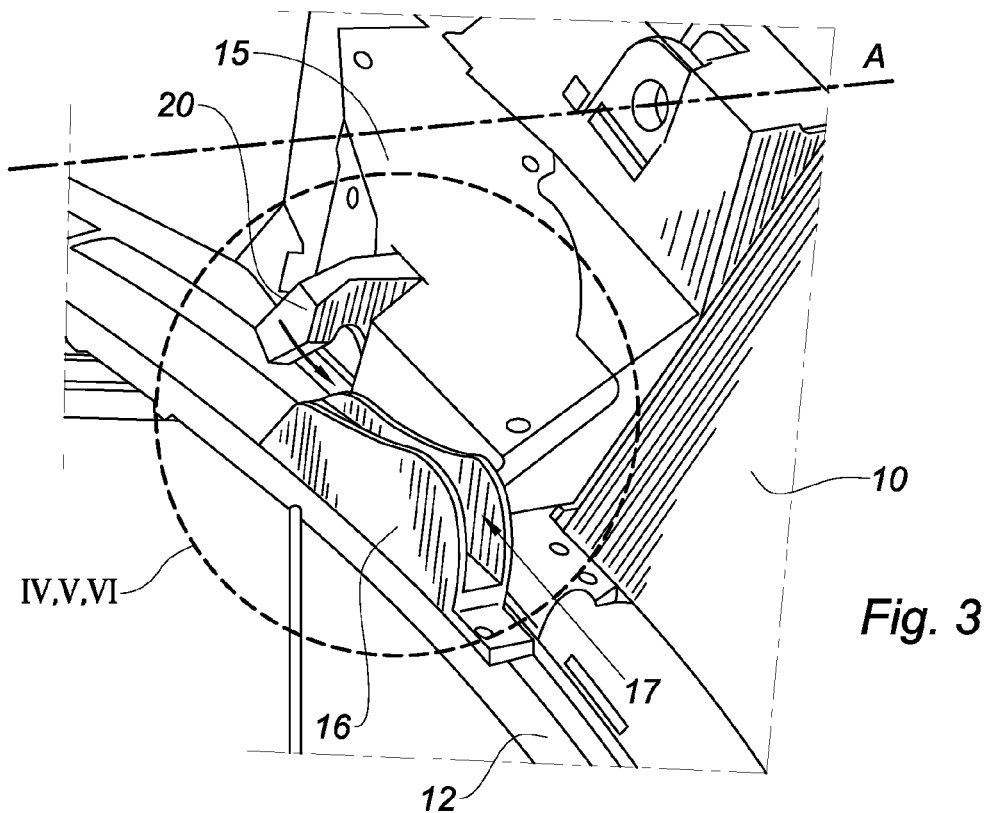
FIG. 3 is an enlarged view in perspective of the means for positioning the half-shells relative to the fixed frame.

FIGS. 3 and 6 represent the nacelle in the working position, in which the half-shells 9, 10 are brought together.

In this position, the finger 20 is separated from the groove 17 formed by the U-shaped section piece 16 and the V-shaped rib 13 of each half-shell 9, 10 is inserted into the matching groove 14 of the fixed frame 12 so that a translation of the half-shells 9, 10 along the axis A is prevented.

When at least one of the half-shells 9, 10 is brought from the working position to the maintenance position, the rib 13 is separated from the matching groove 14.

Simultaneously, the finger 20 is moved relative to the groove formed by the section piece, as indicated by an arrow in FIG. 3.

The finger 20 is then inserted into the groove 17, so that, in the maintenance position of the half-shells 9, 10, the finger 20 is capable of butting against the sidewalls 18, 19 so as to block or immobilize the corresponding half-shell 9, 10 in translation along the axis A.

Once the maintenance operations are finished, the half-shells 9, 10 are again brought together, that is to say are moved to the working position.

The sidewalls 18, 19 are inclined so as to narrow in the direction of engagement of the finger 17 inside the groove when the half-shells are brought closer to one another. When the finger reaches the narrowed zone, as shown in FIG. 5, the range of movement of the corresponding half-shell 9, 10 relative to the fixed frame 12 is limited so as to ensure a correct positioning of the V-shaped rib 13 relative to the corresponding groove 14.

The V-shaped rib 13 is then inserted progressively into the aforementioned groove 14, the wear of these two sensitive elements being limited because of their prior correct positioning.

When the movement bringing the two half-shells 9, 10 together continues, the finger 20 is disengaged from the groove 17 formed by the U-shaped section piece 16 and the V-shaped rib 13 continues to enter the corresponding groove 14 until it reaches the position shown in FIG. 6 in which the two half-shells 9, 10 are in the working position, that is to say are brought completely together.

The system explained above, allowing the guidance of the half-shells when they are respectively opened and the immobilization in translation of the corresponding half-shell in the maintenance position, also makes it possible to form a guide for prepositioning each half-shell when they are installed on the aircraft.

It goes without saying that the disclosure is not limited solely to the embodiment of this turbojet nacelle described above as an example, but, on the contrary, it embraces all the variants. In this way, in particular, each half-shell could be fitted with a U-shaped section piece interacting with a finger placed on the fixed frame.

The invention claimed is:

1. A turbojet nacelle designed to be fitted to an aircraft, the nacelle comprising:
    a forward air-intake section;
    a mid-section designed to surround a fan of the turbojet; and
    an aft section formed from at least a first half-shell and a second half-shell mounted so as to be able to rotate on an axis so that each of the half-shells can deploy between a working position in which the half-shells are brought closer to one another and a maintenance position in which the half-shells are separated from one another, the mid-section and aft section being connected to one another by a frame that is fixed relative to the turbojet, the first and second half-shells being fitted with positioning means interacting in the working position with matching positioning means arranged on the fixed frame,
    wherein the first half-shell at least is fitted with immobilization means interacting, in the maintenance position, with matching immobilization means placed on the fixed frame, in order to prevent the translation of the first half-shell on its axis and in the working position, the immobilization means on the half-shell is completely disengaged from the matching immobilization means on the fixed frame.

2. The nacelle as claimed in claim 1, wherein the immobilization means comprise a finger placed on the first half-shell, the matching immobilization means comprising a groove placed on the fixed frame, or vice versa.

3. The nacelle as claimed in claim 2, wherein, in the working position of the first half-shell, the immobilization finger is retracted from the groove, and in that, in the maintenance position of the first half-shell, the immobilization finger is inserted into the groove.

4. The nacelle as claimed in claim 1, wherein the immobilization finger is disposed adjacent the axis of articulation of the corresponding half-shell.

5. The nacelle as claimed in claim 2, wherein the groove is delimited by a U-shaped section piece fixed to the fixed frame.

6. The nacelle as claimed in claim 2, wherein the groove comprises sidewalls that are inclined relative to one another so as to form a narrowing of the groove in the direction of engagement of the immobilization finger inside the latter when the half-shells are brought closer to one another.

7. The nacelle as claimed in claim 6, wherein the width of the immobilization finger is substantially equal to the width of the groove in its narrowed zone.

8. The nacelle as claimed in claim 6, wherein the immobilization finger and the corresponding groove are arranged so as to allow, when the half-shells are brought closer to one another, the positioning means to come into contact with the matching positioning means only when the finger reaches the narrowed zone of the groove.

9. An aircraft equipped with at least one nacelle as claimed in claim 1.

* * * * *